United States Patent
Crumm et al.

(10) Patent No.: US 8,409,760 B2
(45) Date of Patent: Apr. 2, 2013

(54) METHOD FOR CONTROLLING A WATER BASED FUEL REFORMER

(75) Inventors: Aaron Crumm, Ann Arbor, MI (US); Timothy LaBreche, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 467 days.

(21) Appl. No.: 12/701,747

(22) Filed: Feb. 8, 2010

(65) Prior Publication Data

US 2010/0183930 A1 Jul. 22, 2010

Related U.S. Application Data

(63) Continuation-in-part of application No. 12/321,219, filed on Jan. 20, 2009, now Pat. No. 8,288,055.

(51) Int. Cl.
*H01M 8/04* (2006.01)
*H01M 8/06* (2006.01)

(52) U.S. Cl. ......... 429/423; 429/427; 429/431; 429/444

(58) Field of Classification Search ........................ None
See application file for complete search history.

(56) References Cited

U.S. PATENT DOCUMENTS

| | | | |
|---|---|---|---|
| 3,065,537 A | 11/1962 | Patriarca et al. | |
| 3,124,487 A | 3/1964 | Duddy | |
| 4,278,584 A | 7/1981 | Noguchi et al. | |
| 4,374,184 A | 2/1983 | Somers et al. | |
| 4,728,584 A | 3/1988 | Isenberg | |
| 4,902,249 A | 2/1990 | Morishita et al. | |
| 5,273,839 A | 12/1993 | Ishihara et al. | |
| 5,366,712 A | 11/1994 | Violante et al. | |
| 5,496,655 A | 3/1996 | Lessing | |
| 5,686,198 A | 11/1997 | Kuo et al. | |
| 5,742,149 A | 4/1998 | Simpson | |
| 5,976,724 A | 11/1999 | Bloomfield | |
| 6,348,278 B1 | 2/2002 | Lapierre et al. | |
| 6,562,496 B2 | 5/2003 | Faville et al. | |
| 6,602,626 B1 * | 8/2003 | Allen | 429/425 |
| 6,630,116 B2 | 10/2003 | Balachandran et al. | |
| 6,677,066 B1 | 1/2004 | Jansen et al. | |
| 7,116,079 B2 | 10/2006 | Bayne et al. | |
| 7,229,712 B2 | 6/2007 | Eshraghi et al. | |

(Continued)

FOREIGN PATENT DOCUMENTS

| | | |
|---|---|---|
| DE | 19907369 A1 | 8/2000 |
| JP | 2005515585 A | 5/2005 |

OTHER PUBLICATIONS

C. Kokkofitis et. al., Catalyst and electrocatalytic production of H2 from the water shift reaction over Pd in a high temperature proton-conducting cell-reactor, Solid State Ionics 178 (2007) 475-480, Elsevier B.V.

(Continued)

*Primary Examiner* — Jonathan Crepeau (74) *Attorney, Agent, or Firm* — Endurance Law Group, PLC (57) ABSTRACT

A method for operating a fuel cell system includes monitoring a signal indicative of a water level within the fuel cell system. The method further includes determining an anode air flow rate based on the monitored signal indicative of water level. The method further includes controlling the anode air actuator based on the determined anode air flow rate.

12 Claims, 6 Drawing Sheets

U.S. PATENT DOCUMENTS

| | | | |
|---|---|---|---|
| 7,374,835 B2 | 5/2008 | Kendall et al. | |
| 7,629,069 B2 | 12/2009 | Finnerty | |
| 7,767,353 B2 | 8/2010 | Konoto et al. | |
| 7,956,573 B1 | 6/2011 | Rosen | |
| 2001/0053465 A1 | 12/2001 | Fuglevand | |
| 2003/0003332 A1 | 1/2003 | Sederquist et al. | |
| 2003/0138683 A1 | 7/2003 | Bai et al. | |
| 2003/0143445 A1 | 7/2003 | Daniel et al. | |
| 2003/0162067 A1 | 8/2003 | McElroy | |
| 2004/0048120 A1 | 3/2004 | Haltiner et al. | |
| 2004/0115503 A1 | 6/2004 | Jacobson et al. | |
| 2004/0202900 A1 | 10/2004 | Pavio et al. | |
| 2005/0026028 A1 | 2/2005 | Ouchi et al. | |
| 2005/0112452 A1 | 5/2005 | Crumm et al. | |
| 2005/0123810 A1 | 6/2005 | Balan | |
| 2005/0123813 A1 | 6/2005 | Matoba et al. | |
| 2005/0233187 A1 | 10/2005 | Pastula et al. | |
| 2006/0024547 A1 | 2/2006 | Waldbillig et al. | |
| 2006/0063044 A1 | 3/2006 | Devries | |
| 2006/0192523 A1 | 8/2006 | Nomoto | |
| 2006/0216540 A1 | 9/2006 | Budinger et al. | |
| 2006/0228593 A1 | 10/2006 | Grieve et al. | |
| 2006/0246329 A1 | 11/2006 | Gopal et al. | |
| 2007/0141447 A1 | 6/2007 | Crumm et al. | |
| 2007/0188130 A1 | 8/2007 | Scheucher | |
| 2007/0231631 A1 | 10/2007 | Venkataraman | |
| 2007/0243444 A1 | 10/2007 | Zheng et al. | |
| 2007/0259218 A1 | 11/2007 | Tung et al. | |
| 2008/0179955 A1 | 7/2008 | Nakashima et al. | |
| 2008/0241612 A1 | 10/2008 | Ballantine et al. | |
| 2009/0068446 A1 | 3/2009 | Bischof et al. | |
| 2009/0128087 A1 | 5/2009 | Ohmori | |
| 2010/0173208 A1* | 7/2010 | Hatada | 429/423 |

OTHER PUBLICATIONS

C. Zuo et. al, Ba(Zr0.1Ce0.7Y0.2) as an Electrolyte for Low-Temperature Solid-Oxide Fuel Cells Advanced Materials 20063318•3320 18, 3318•320, WILEY.VCH Verlag GmbH & Co. KGeA, Weinheim.

Guangyao Meng, Ceramic membrane fuel cells based on solid proton electrolyte, Solid State Ionics 178 (2007) 697-703, Elsevier B.V.

R.V. Siriwardane et. al., Characterization of ceramic hydrogen separation members with varying nickel concentrations, Applied Surface Science 167 (2000) 34-50, Elsevier Science B.V.

U. Balachandran et al., Hydrogen production by water dissociation using mixed conducting dense ceramic membranes, International Journal of Hydrogen Energy, 32 (2007) 451•456.

U. Balachandran et al., Hydrogen separation by dense cermet membranes, Fuel, 85 (2006) 150-155.

U. Balachandran et. al., Development of Mixed-Conducting Ceramics for Gas Separation Applications, Symposium on Solid State Ionics, Materials Research Society Fall Meeting,p. 1-6, Nov. 30-Dec. 4, 1998, Boston, MA.

W. Grover Coors, Protonic ceramic steam-permeable membranes, Solid State Ionics 178 (2006), 481•485, Elsevier B.V.

Zuo et al. "Composite NiBa(Zr0.1Ce0.7Y0.2)O3 membrane for hydrogen separation." Journal of Power Sources 159.2(2006): 1291-295.

FS100UMJ data sheet, Feb. 1999.

MC68HC705P6A data sheet, Sep. 2005.

Sammes et al., "Design and Fabrication of a 100 W anode supported micro-tubular SOFC stack", 2005, Journal of Power Sources, 145, p. 428-434.

* cited by examiner

METHOD FOR CONTROLLING A WATER BASED FUEL REFORMER

CROSS-REFERENCE TO RELATED APPLICATION

The present application is a continuation-in-part, and claims the benefit of U.S. patent application Ser. No. 12/321,219 now U.S. Pat. No. 8,288,055 filed on Jan. 20, 2009, which is hereby incorporated by reference in its entirety.

FIELD OF THE INVENTION

The present disclosure is related to solid oxide fuel cell systems generating hydrogen in an internal reformer utilizing water recovery.

BACKGROUND

The statements in this section merely provide background information related to the present disclosure and may not constitute prior art. Fuel cells have been developed for portable power applications to compete with portable generators, batteries, and other energy conversion devices. Fuel cells are advantageous over generators in that fuel cells can operate at higher fuel-to-energy conversion efficiency levels. In particular, a generator's efficiency is limited by an efficiency ceiling defined by the generator's thermal cycling. Because fuel cells convert a fuel's chemical energy directly to electrical energy, fuel cells can operate at efficiency levels that are much higher than generators at comparable power levels. Further, portable generator systems generally do not efficiently power and energy requirements for applications requiring low amounts of continuous power, for example less than one kilowatt of continuous power, wherein a fuel cell system can operate efficiently within this power range.

Portable fuel cell systems can meet power and energy requirements that are not met by either batteries or other energy conversion devices. For example, high-efficient lithium ion batteries can have more than ten times the weight-to-energy ratio as an energy equivalent fuel cell system inclusive of three days of fuel.

Improvements in performance and cost reduction will enable the large-scale adoption of fuel cells in the commercial marketplace. Areas for fuel cell performance improvement include fuel cell system weight improvements, fuel cell fuel efficiency improvements, and fuel cell durability improvements. Areas of cost improvements include reducing material costs, improving high volume manufacturing efficiency, decreasing fuel consumption, and decreasing operating costs.

The following description and figures sets forth a fuel cell system having improvements in performance and cost, which will progress adoption of fuel cell systems in the commercial applications.

SUMMARY

A method for operating a fuel cell system includes monitoring a signal indicative of a water level within the fuel cell system. The method further includes determining an anode air flow rate based on the monitored signal indicative of water level. The method further includes controlling the anode air actuator based on the determined anode air flow rate.

It should be understood that the appended drawings are not necessarily to scale, presenting a somewhat simplified representation of various preferred features illustrative of the basic principles of the invention. The specific design features of the electric power generation device will be determined in part by the particular intended application and use environment. Certain features of the illustrated embodiments have been enlarged or distorted relative to others for visualization and clear understanding. In particular, thin features may be thickened, for example, for clarity of illustration.

DETAILED DESCRIPTION OF THE EMBODIMENTS

In one exemplary embodiment, disclosed herein is a fuel cell system configured to operate at high fuel efficiency levels. In one embodiment, an exemplary fuel cell system is configured to operate utilizing onboard partial oxidative reforming. In one embodiment, an exemplary fuel cell is configured to operate utilizing onboard autothermal reforming. In one embodiment, an exemplary fuel cell system is configured to operate utilizing onboard steam reforming. The exemplary fuel cell systems can also include startup, shutdown and other transient operating modes.

In one embodiment, an exemplary fuel cell system is configured to operate utilizing multiple operating modes, wherein the operating modes include partial oxidative reforming mode, autothermal reforming mode, and steam reforming mode. Further, hydrogen generation, water generation and hydrogen separation each occur within a solid oxide fuel cell tube. Exemplary fuel cell systems are configured to operate in at least one of autothermal reforming mode and steam reforming mode without requiring an onboard water storage tank. However, in alternate embodiments, an onboard water storage tank may be utilized to supplement or assist in the autothermal and steam reforming processes. The exemplary portable fuel cells can recycle water produced from the fuel cell reactions for onboard reforming.

As used herein, the term "partial oxidation," refers to a process wherein a raw fuel and air are provided in a substoichiometric fuel-to-air mixture, wherein the fuel is partially combusted to form carbon monoxide and hydrogen gases. Although, generally referred to throughout the specification as partial oxidation, the partial oxidation mode can further include processes in which a portion of the raw fuel is partially combusted and a portion of the raw fuel is fully combusted by oxygen.

As used herein, the term "autothermal reforming" refers to a process in which oxygen and steam (water vapor) are reacted with a raw fuel to form hydrogen gas and carbon monoxide. Raw fuel can include any of a wide variety of molecules comprising hydrogen and carbon for example, hydrocarbons and oxygenated hydrocarbons, and in particular, methanol, ethanol, butane, propane, octane, kerosene, gasoline, diesel fuel, JP-8 fuel and the like.

As used herein, the term "steam reforming" refers to a process in which steam (water vapor) is reacted with a raw fuel to form hydrogen gas in a low oxygen environment or a substantially oxygen-free environment.

Figure 1A:
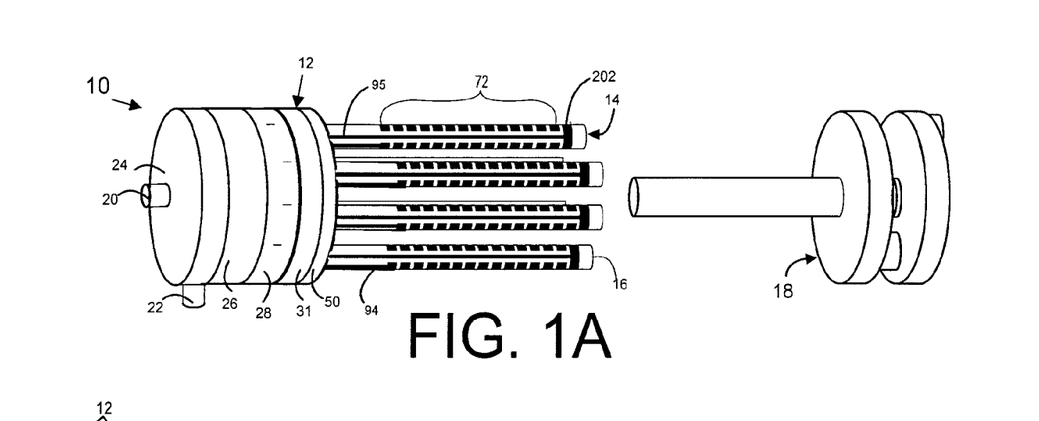
FIG. 1A depicts a prospective view of a fuel cell system in accordance within an exemplary embodiment of the present disclosure.
Figure 1B:
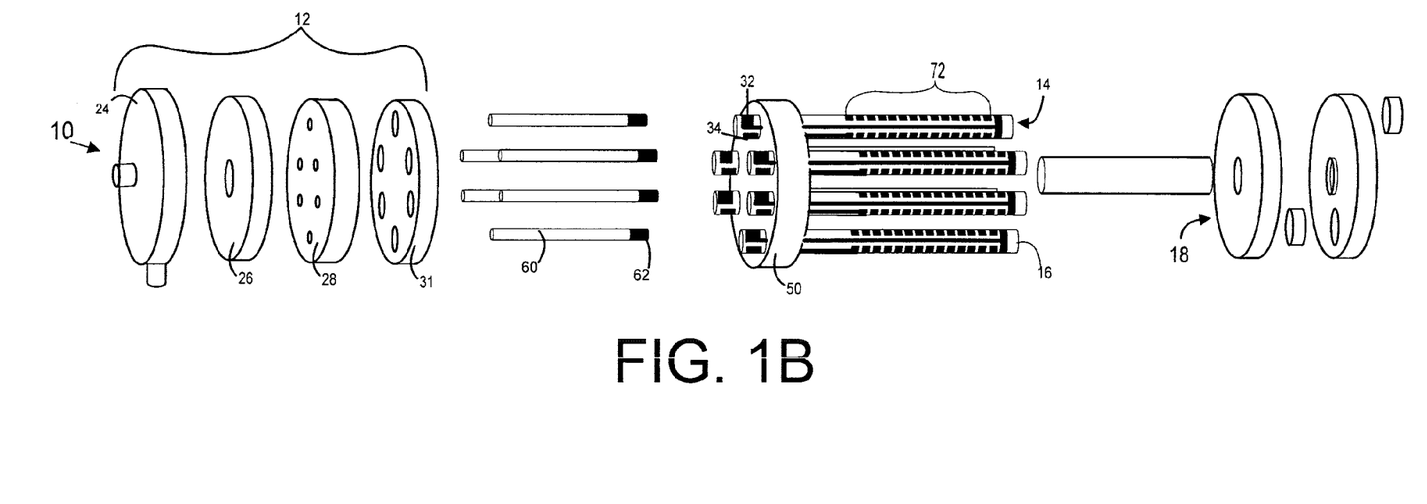
FIG. 1B depicts an exploded prospective view of the fuel cell system of FIG. 1A.
Figure 2:
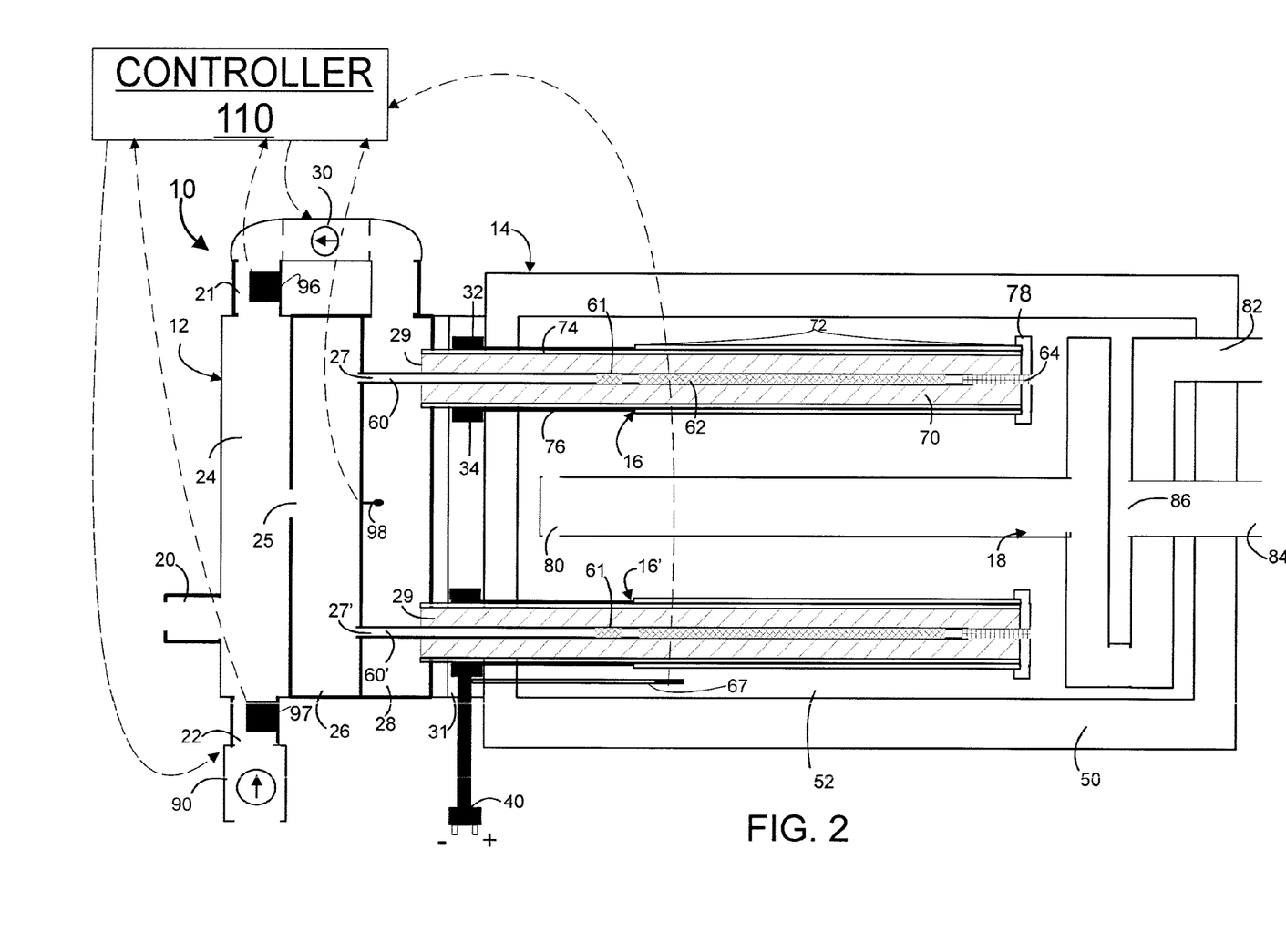
FIG. 2 depicts a cross-sectional view of the fuel cell system of FIG. 1A.

Referring to FIG. 1A, FIG. 1B, and FIG. 2 a solid oxide fuel cell system 10 includes a manifold 12, a fuel cell stack 14 and a controller 110. The fuel cell system 10 further includes balance of plant components including a cathode air pump, (not shown) and various other actuators, valves, sensors, electrical transfer components, and control components not depicted in the figures. The exemplary fuel cell system 10 is a portable fuel cell system configured for human or vehicle transport. However, features of exemplary fuel cell system described herein are also applicable to stationary fuel cell systems.

The manifold 12 comprises a mixing portion 24, a distribution portion 26, a water collection portion 28, a conduit 21, an electrical connector portion 31, recycled water flow sensor 96, recycled water diverter valve 41, anode air flow sensor 97, a humidity sensor 98, an anode air pump 90, and a water pump 30. The manifold 12 receives air through the air inlet 22 and raw fuel through the fuel inlet 20. Water from the fuel cell anode 204 (FIG. 7) is routed to the collection chamber 28 of the manifold 12 through the water inlet 29. Water concentration within the collection chamber 28 can be measured utilizing the humidity sensor 98. In alternate embodiment, water from an external water source can be introduced to the mixing chamber 12 through the fuel inlet 20 or through a second water inlet (not shown).

The fuel cell stack 14 includes an insulative body 50 defining an insulative chamber 52, a plurality of fuel cell tubes (each of which are generally referred to as fuel cell tube 16), a plurality of fuel feed tubes (each of which are generally referred to as fuel feed tube 60), a heat recuperator 18, a cap member 78, and a thermocouple 67. The fuel cell stack 14 further includes a partial oxidation reformer 61 and a water-based reformer 62, each of which are disposed within each fuel feed tube 60, and a hydrogen separation membrane 64 extending out of each fuel feed tube 60. The fuel feed tube 60 provides gas impermeable separation of fluids. In an alternate embodiment, the hydrogen separation 64 member is integrated into the fuel feed tube 60, wherein a porous portion of the fuel feed tube is coated with hydrogen separation material (e.g., a palladium membrane) to provide hydrogen separation functionality.

The partial oxidation reformer 61 comprises a catalytic material composition and microstructure configured for partial oxidation reforming, and the water-based reformer comprises a catalytic material composition and microstructure configured for autothermal and steam reforming. However, water-based reforming reactions may occur at the partial oxidation reformer 61 and partial oxidation reforming reaction may occur at the water-based reformer 62. Further, although fuel cell stack 14 includes two separate reformers comprising catalytic material optimized for specific reforming processes, in alternate embodiments, a single reformer comprising single or multiple catalytic material compositions can be utilized for both partial oxidation and water-based reforming.

During operation, recycled water is routed from the collection chamber 28 to the mixing chamber 24 through a conduit 21, and water can be motivated from the collection chamber 28 to the mixing chamber 24 by the water pump 30. The mixing chamber 24 can receive water from the conduit 21, fuel from the fuel inlet 20 and air from the air inlet 22, and fuel is mixed with at least one of air and water in the mixing chamber 24. Fuel along with air and/or water are routed through a distribution chamber inlet 25 and through the distribution chamber into each fuel feed tube inlet 27. In an alternate embodiment, a pressure difference, for example pressure gradients resulting from water concentrations gradients within the manifold 12 can motivate the water through the manifold 12 without utilizing a pump, blower, or the like.

The heat recuperator 18 is provided to transfer heat between fuel cell exhaust and incoming cathode air to the insulated chamber 52. The cathode air is routed to cathode portions (depicted as 210 in FIG. 7) of the fuel cell tubes 16 and is utilized as an electrochemical reactant for reactions at the cathode of the fuel cell tubes 16. The heat recuperator 18 includes an air inlet 82, an air outlet 80, an exhaust inlet 86, and an exhaust outlet 84.

The fuel feed tube 60 extends from the distribution chamber 26 into the insulation chamber 52. The fuel feed tube 60 is disposed in a fuel cell tube 16, wherein the fuel cell tube 16 extends from the water recycle chamber 28 into the insulated chamber 52. The insulative body 50 can comprise high-temperature, ceramic-based material for example, foam, aerogel, mat-materials, and fibers formed from, for example, alumina, silica, and like materials.

The fuel feed tube 60 can comprise a dense ceramic material compatible with the high operating temperatures within the insulated chamber 52, for example, an alumina based material or a zirconia based material. In an alternate embodiment the fuel feed tube can comprises metallic materials and can, for example, be utilized as current collectors for the fuel cell electrodes.

The partial oxidation reformer 61 and the water-based reformer 62 each comprise a metallic catalyst material such as platinum, rhodium, rubidium, nickel and the like disposed on a ceramic substrate such as an alumina, ceria or a zirconia substrate. Each partial oxidation reformer 61 and the water-based reformer 62 can be designed and located within the fuel feed tube to manage catalytic reactions and thermal distribution within the fuel stack 14. Material compositions for the partial oxidation reformer 61 and the water-based reformer 62 capable of the operating characteristics described above will be apparent to those skilled in the art.

The hydrogen separation member 64 is disposed at an end of the fuel feed tube 27 and extends out an end of the fuel feed tube 72 such that hydrogen can travel from an outer circumference hydrogen separation member 64 to an anode of the fuel cell tube 16. The hydrogen separation member 64 comprises a hydrogen separation layer including palladium or a palladium alloy. Exemplary palladium alloys can comprise palladium along with one or more of titanium, copper, silver, vanadium, and yttrium. In one embodiment, a hydrogen separation member includes a hydrogen separation layer comprising an alloy including zinc and nickel.

In an alternate embodiment, the hydrogen separation member comprises an electrically conductive matrix, a support member and/or a proton conducting matrix. In an exemplary embodiment, the electrically conductive matrix comprises primarily nickel metal. In an alternative exemplary embodiment, the electrically conductive matrix comprises a palladium or a nickel-palladium matrix. The electrically conductive matrix can further comprise dopants to increase the durability of the electrically conductive matrix. The desired ratio of the electrically conductive matrix material to proton conducting carrier material for conducting hydrogen ions across the hydrogen separation member 64 can be determined based on the percolation limit, the proton conductivity of the proton conducting carrier, and the electrical conductivity of the electrically conductive matrix. The support layer comprises porous material generally compatible with proton conducting layer (including compatible with thermal expansion properties and including low reactivity) and with the operating environment of the hydrogen separation member. In one embodiment, the support layer comprises yttria, stabilized zirconia. In alternate embodiment, the support material can comprise other material.

In another alternate embodiment, the hydrogen separation member 64 can include perovskite materials represented by the general formula $AB_{1-x}M_xO_{3-\delta}$ (where A is a divalent cation such as Sr or Ba, B is Ce or Zr, M is a fixed-valent dopant such as Y, Yb, Nd, or Gd), and proton conduction within the perovskite material can be induced through the substitution of trivalent dopant ions on the B site. This substitution results in the formation of vacant oxygen sites, or in oxidizing atmospheres, the creation of electron holes. Mobile protons can then be introduced through the uptake hydrogen ions that are generated at the fuel reforming catalysts. In alternate embodiments, hydrogen can be separated utilizing membranes that function utilizing various other mechanisms. In one embodiment, hydrogen migrates between a first side and a second side of the membrane comprising a lattice structure by migrating between interstitial sites of the lattice structure.

Figure 7:
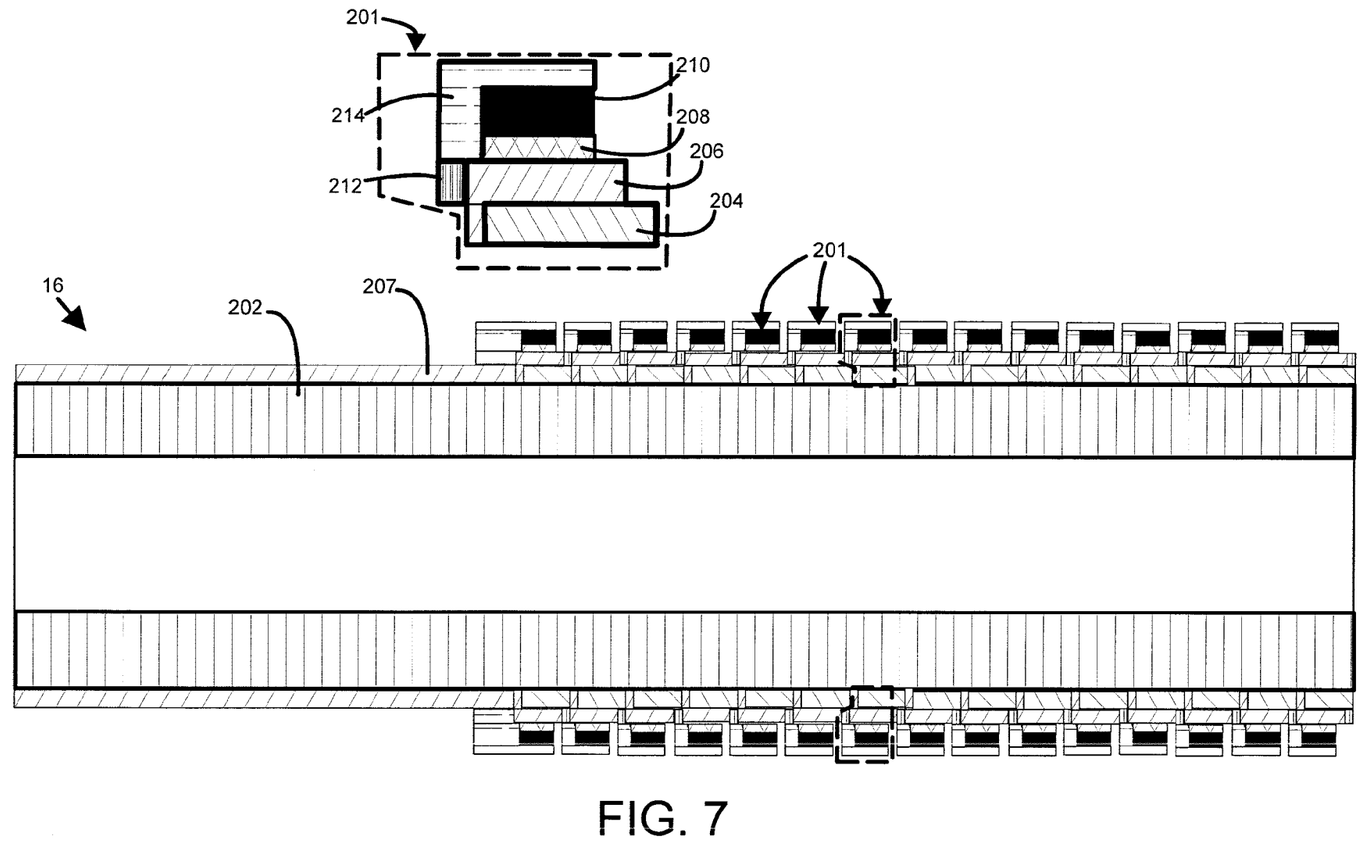
FIG. 7 depicts a cross-sectional view of a fuel cell tube of the fuel cell system of FIG. 1A.

As depicted in FIGS. 1A, 1B, 2, 4, 5, 6, and 7, in one embodiment, the fuel cell system 10 includes solid oxide fuel cell tubes 16 having multiple active areas electrically interconnected in series ("cell-in-series design"). Referring to FIG. 7, the fuel cell tube 16 includes a support portion 202, a gas and electron barrier portion 207, and a plurality of cells units 201. Each cell unit 201 includes an anode portion 204, an electrolyte portion 206, an intermediate portion 208, a cathode portion 210, an interconnect portion 212, and a current collector portion 214. Collectively for each fuel cell tube 16, the anode portions 204 are referred to as "anode" herein, the electrolyte portions 206 are referred to as "electrolyte" herein and the cathode portions 210 are referred to as "cathode" herein. The support portion 202 can be formed through extrusion processes, pressing processes, casting processes, and like processes for forming ceramic members. For an exemplary thermoplastic extrusion processes see U.S. Pat. No. 6,749,799 to Crumm et al, entitled METHOD FOR PREPARATION OF SOLID STATE ELECTROCHEMICAL DEVICE, the entire contents of which is hereby incorporated by reference, herein.

In an exemplary thermoplastic ceramic extrusion process for forming support portion 202, a compound is prepared from 85.9 weight percent of 8 mole % yttria stabilized zirconia powder, 7.2 weight percent of polyethylene polymer, 5.3 weight percent of acrylate polymer, 1.0 weight percent of stearic acid, and 0.3 weight percent of heavy mineral oil, 0.3 weight percent of polyethylene glycol of a molecular weight of 1000 grams per mole. The microstructure and porosity of the support portion 202 can be tailor for desired gas diffusion and for compatibility with other portions of the fuel cell tube 16 including the electrolyte portion 206 and the barrier portion 207. The exact microstructure and porosity of the support portion 202 can be controlled in several ways, including through the sintering temperature, particle size distribution of the ceramic powder and by the use of pore-forming additives, such as carbon particles or similar pore-formers.

The anode portion 204 comprises an electrically and ionically conductive cermet that is chemically stable in a reducing environment. In an exemplary embodiment, the anode portion 204 comprises a conductive metal such as nickel, disposed within a ceramic skeleton, such as yttria-stabilized zirconia.

Exemplary materials for the electrolyte portion 206 and electrolyte portion 207 can include zirconium-based materials and cerium-based materials such as, yttria-stabilized zirconia and gadolinium doped ceria, and can further include various other dopants and modifiers to affect ion conducting properties. The anode portion 204 and the cathode 210, which form phase boundaries (gas/electrolyte/electrode particle; commonly known as triple points) with the electrolyte portion 206 and are disposed on opposite sides of the electrolyte portion 206 with respect to each other.

The electrolyte portion 206 is disposed both on a surface of the anode portion 204 parallel to the anode portion 204 and abutting the anode portion 204. The section of the electrolyte portion 206 parallel to the anode portion provides an ion conduction pathway and electron insulation between the anode portion 204 and the cathode portion 210. The section of the electrolyte 204 abutting the anode portion 204 provides electron insulation between anode portions of separate cell units 201.

In general, the anode portion 204 and cathode portion 210 are formed of porous materials capable of functioning as an electrical conductor and capable of facilitating the appropriate reactions. The porosity of these materials allows dual directional flow of gases (e.g., to admit the fuel or oxidant gases and permit exit of the byproduct gases).

The cathode comprises a conductive material chemically stable in an oxidizing environment. In an exemplary embodiment, the cathode comprises a perovskite material and specifically lanthanum strontium cobalt ferrite (LSCF). In an exemplary embodiment, each of the anode, electrolyte, and cathode are disposed within a range, of about 5-50 micrometers. An intermediate layer 208 may be disposed between the cathode portion 210 and the electrolyte portion 206 to decrease reactivity between material in the cathode portion 210 and material in the electrolyte portion 206. In an exemplary embodiment, the intermediate portion 208 comprises strontium-doped cobaltate (SDC), and is disposed at a thickness within the range of 1-8 micrometers.

The interconnection portion 212 electrically connects an anode of a cell unit to a cathode of a separate cell unit such that electrons can be conducted in series between the cell units. In an exemplary embodiment the interconnection portion comprises platinum. The current collector portion 214 conducts electrons across the cathode portion 210. In an exemplary embodiment, the current collector portion comprises a silver palladium alloy.

The exemplary fuel cell tube 16 can be manufactured utilizing a screen printing process wherein each portion is screen-printed utilizing one or more screen printing patterns per portion, and wherein each portion is then fired individually or co-fired with other portions. The term "pattern" used in the following refers to material deposition arrangements that either individually or along with complementary patterns form the anode portion 204, electrolyte/barrier portion 206, the intermediate portion 208, the cathode portion 210, the interconnect portion 212, and the current collector portion 214. In an exemplary embodiment, an anode portion pattern, a first electrolyte/barrier layer pattern, a second electrolyte barrier layer pattern, and an interconnect are printed in sequence with a low temperature drying step between each step. The anode pattern, the first electrolyte/barrier layer pattern, the second electrolyte barrier layer pattern, and the interconnect pattern are co-fired at a temperature of about 1200-1600 degrees Celsius to form a first sintered composite.

An intermediate pattern is printed on the first sintered composite and fired at a firing temperature of about 1150-1400 degrees Celsius to form a second sintered composite. A cathode pattern, a first current collector pattern, and a second current collector pattern are printed on the second sintered composite. The cathode pattern, the first current collector pattern, and the second current collector pattern are printed on the second sintered composite and are fired at a firing temperature of about 950 degrees Celsius to about 1200 degrees Celsius.

Figure 3:
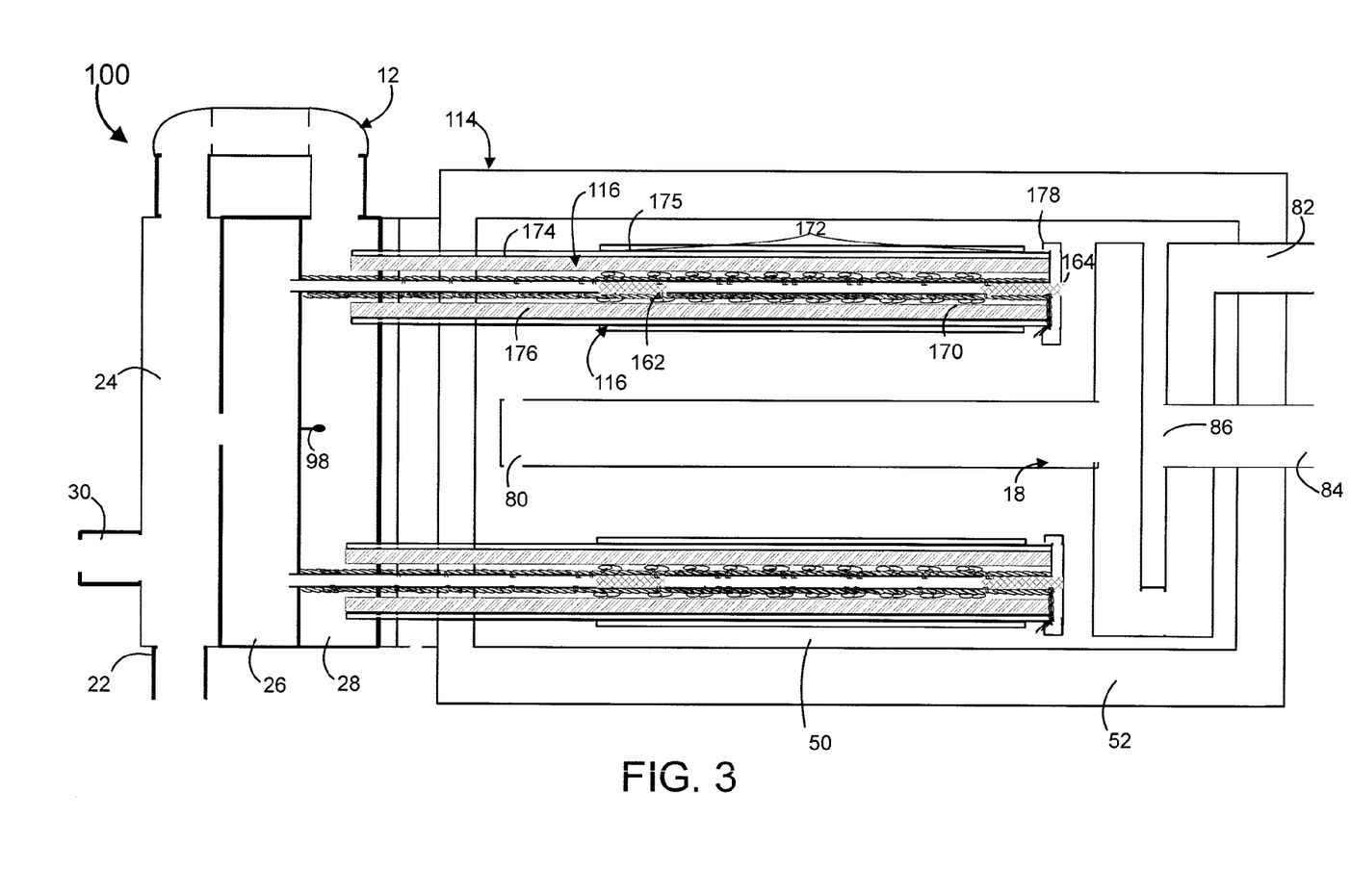
FIG. 3 depicts a cross-sectional view of a fuel cell system in accordance with another exemplary embodiment of the present disclosure.

As depicted in FIG. 3, another exemplary fuel cell system 100 comprises the manifold 12 and a fuel cell stack 114. The fuel cell stack 114 comprises substantially similar components to the fuel cell stack 14 described above, except in that the fuel cell stack 114 includes fuel cell tubes 116 comprising a single electrochemical cell over a continuous active area 172 and in that the fuel cell stack 114 includes internal current collectors 162 and external current collectors (not shown). Each fuel cell tube 116 includes an anode layer 176, an electrolyte layer 174, and a cathode layer 175. The anode layer comprises substantially similar material to the anode portion 204 of the fuel cell tube 16, and the electrolyte layer 174 comprises substantially similar material to the electrolyte portion 206 of the fuel cell tube 16. The cathode layer 175 comprises substantially similar material to the cathode portion 210 and an intermediate layer (not shown) comprises substantially similar material to the intermediate portion 208. The portion of the fuel cell tube having the cathode layer 175 defines the active area 172. The fuel cell stack 114 can comprises fuel cell tubes similar to those described in U.S. Pat. No. 6,749,799 to Crumm et al.

Figures 4, 5, 6:
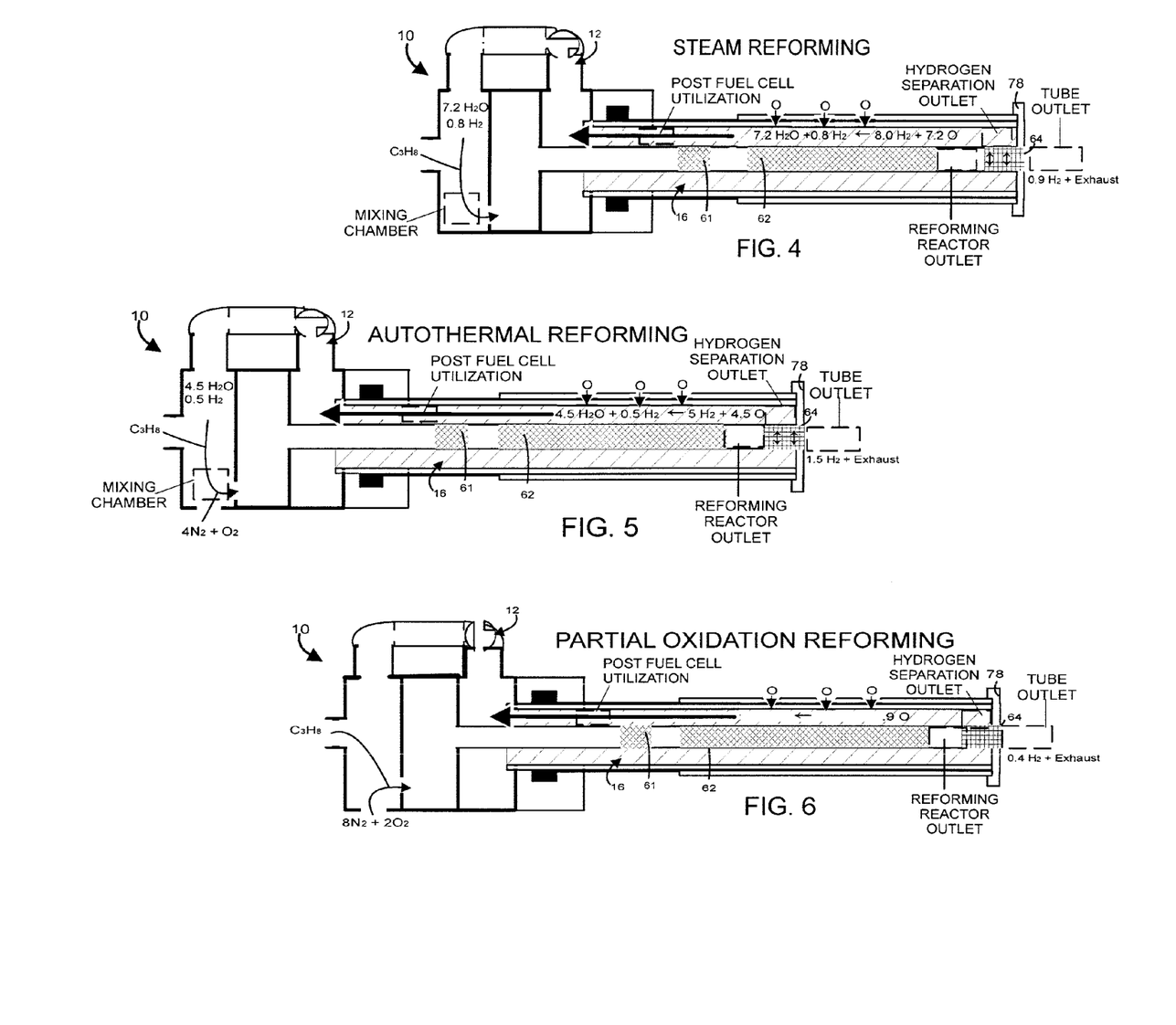
FIG. 4 depicts a cross-sectional view of a portion of the fuel cell system of FIG. 2 illustrating representative reaction yields when operating in a steam reforming operating mode.
FIG. 5 depicts a cross-sectional view of a portion of the fuel cell system of FIG. 2 illustrating representative reaction yields when operating in an autothermal reforming operating mode.
FIG. 6 depicts a cross-sectional view of a portion of the fuel cell system of FIG. 2 illustrating representative reaction yields when operating in a partial oxidation reforming mode.

Referring to FIG. 4 and Table 1 below the exemplary fuel cell system 10 can generate molecular species at representative, substantially consistent exemplary levels while operating at steady-state in a steam reforming mode.

TABLE 1

Steady-State Steam Reforming Mode

| Species | Mixing Chamber | Inside Tube and Post Reformers | Tube Outlet | Hydrogen Separation Outlet | Post Fuel Cell Utilization |
|---|---|---|---|---|---|
| H2 | 0.8 | 8.9 | 0.9 | 8.0 | 0.8 |
| H2O | 7.2 | 2.7 | 2.7 | 0 | 7.2 |
| C3H8 | 1.0 | 0 | 0 | 0 | 0 |
| LIGHT HC | 0 | 0.1 | 0.1 | 0 | 0 |
| CO | 0 | 0.9 | 0.9 | 0 | 0 |
| CO2 | 0 | 1.8 | 1.8 | 0 | 0 |
| O2 | 0 | 0 | 0 | 0 | 0 |
| N2 | 0 | 0 | 0 | 0 | 0 |

The column headings of Tables 1, 2, and 3 refer to molar ratios of molecular species "Species" and to locations of the fuel cell system 10 as depicted in FIGS. 3, 4, and 5, respectively. In particular, "Mixing Chamber" refers to a location within the mixing chamber 24, "Reforming Reactor Outlet" refers at an outlet of the water-based reformer 62 and downstream the partial oxidation reformer 61, "Tube Outlet" refers to an outlet of the fuel cell tube 16, "Hydrogen Separation Outlet" refers to a location at an outlet of the hydrogen separation member 64 and "Post Fuel Utilization" refers to location within porous ceramic portion of the fuel cell tube 16 downstream the active area 72.

In the exemplary steam reforming mode, the internal reformer continually converts 90% of the propane to hydrogen. Further, 90% of the hydrogen generated in the internal reformer 62 is retained within the system and 10% escapes from the system either through exhaust stream (as shown) or through openings in other parts of the fuel cell system 10. Further, the fuel cell system 10 operates at 90% fuel cell fuel utilization, that is, 90% of the hydrogen delivered to inner electrodes (i.e., the anode portion or the anode layers described above) is utilized in electrochemical reactions generating water and 10% of the hydrogen remains unreacted. "Light HC" refers to light hydrocarbon molecular components provided by incomplete oxidation of propane within the partial oxidation reformers 61 and the water based reformer 62.

Heat is generated by electrical resistance within the fuel cell tubes 16 and by combustion of combustible exhaust components within the insulated chamber 50. Heat is consumed by the endothermic steam reforming reactors within the internal reformer. The thermocouple 67 (FIG. 2) is disposed within the fuel cell stack to monitor temperature proximate the partial oxidation reformers 61 and the water based reformer 62. Therefore, the heat levels within the fuel cell stack can be controlled to maintain thermal equilibrium based on signals from the temperature sensor 67 by controlling the current draw from the fuel cell tubes, along with controlling air flow rates and fuel flow rate in the fuel cell stack.

Referring to FIG. 5 and Table 2 below, the exemplary fuel cell system 10 can generate molecular species at the representative, substantially consistent levels while operating at steady-state in an auto-thermal reforming mode.

TABLE 2

Steady-State Autothermal Reforming Mode

| Species | Mixing Chamber | Inside Tube and Post Reformers | Tube Outlet | Hydrogen Separation Outlet | Post Fuel Cell Utilization |
|---|---|---|---|---|---|
| H2 | 0.5 | 6.5 | 1.5 | 5.0 | 0.5 |
| H2O | 4.5 | 1.5 | 1.5 | 0 | 4.5 |
| C3H8 | 1.0 | 0 | 0 | 0 | 0 |
| vLIGHT HC | 0 | 0.25 | 0.25 | 0 | 0 |
| CO | 0 | 0.75 | 0.75 | 0 | 0 |
| CO2 | 0 | 1.5 | 1.5 | 0 | 0 |
| O2 | 1.0 | 0.62 | 0.62 | 0 | 0 |
| N2 | 4.0 | 4.0 | 4.0 | 0 | 0 |

In the exemplary autothermal reforming mode, the combined reformers 61 and 62 continually converts 75% of the propane to hydrogen. Further, 77% of the hydrogen generated in the reforming reactor is retained within the system and 23% escapes from the system either through exhaust stream (as shown) or through openings in other parts of the fuel cell system. Further, the fuel cell system 10 operates at 90% fuel cell fuel utilization, that is, 90% of the hydrogen delivered to inner electrodes (i.e., the anode portion or the anode layers described above) is utilized in electrochemical reactions generating water.

Referring to FIG. 6 and Table 3 below the exemplary fuel cell system 10 can generate molecular species at the representative, substantially consistent, levels while operating at steady-state in a partial oxidation reforming mode.

TABLE 3

Steady-State Partial Oxidation Reforming Mode

| Species | Mixing Chamber | Inside Tube and Post Reformers | Tube Outlet | Hydrogen Separation Outlet | Post Fuel Cell Utilization |
|---|---|---|---|---|---|
| H2 | 0.0 | 2.4 | 0.2 | 2.2 | 2.0 |
| H2O | 0.0 | 0 | 0 | 0 | 0 |
| PROPANE | 1.0 | 0 | 0 | 0 | 0 |
| LIGHT HC/CO2 | 0 | 0.4 | 0.4 | 0 | 0 |
| CO | 0 | 1.8 | 1.8 | 0 | 0 |
| O2 | 2.0 | 1.1 | 1.1 | 0 | 0 |
| N2 | 8.0 | 8.0 | 8.0 | 0 | 0 |

In the exemplary partial oxidation reforming mode, the internal reformer continually converts 60% of the propane to hydrogen. Although each of the figures depict exemplary steady-state of the fuel cell system 10, it is to be understood that the fuel cell can dynamically adjust air, fuel, and power draw and is therefore, capable of establishing steady-state producing numerous steady-state levels. Further, the fuel cell can continuously dynamically adjust air, fuel and power draw levels thereby dynamically changing the level of species within the fuel cell system 10.

In one exemplary method for controlling the fuel cell system 10, the controller 110 detects a water vapor level measured by the water vapor sensor 98 and controls energy of the water pump 30 and the air pump 90 based on the measured water vapor level, thereby controlling the fuel cell system in one of the steam reforming operating modes, the autothermal operating modes and the partial oxidation reforming operating modes.

In order to achieve the steady-state operating modes described above, the fuel cell systems can utilize external energy sources such as external heaters (i.e., resistive heaters or combustive heaters), and external water sources. However, in one exemplary embodiment, the fuel cell system can achieve autothermal reforming and steam reforming without utilizing external energy source or external water sources.

Figure 8:
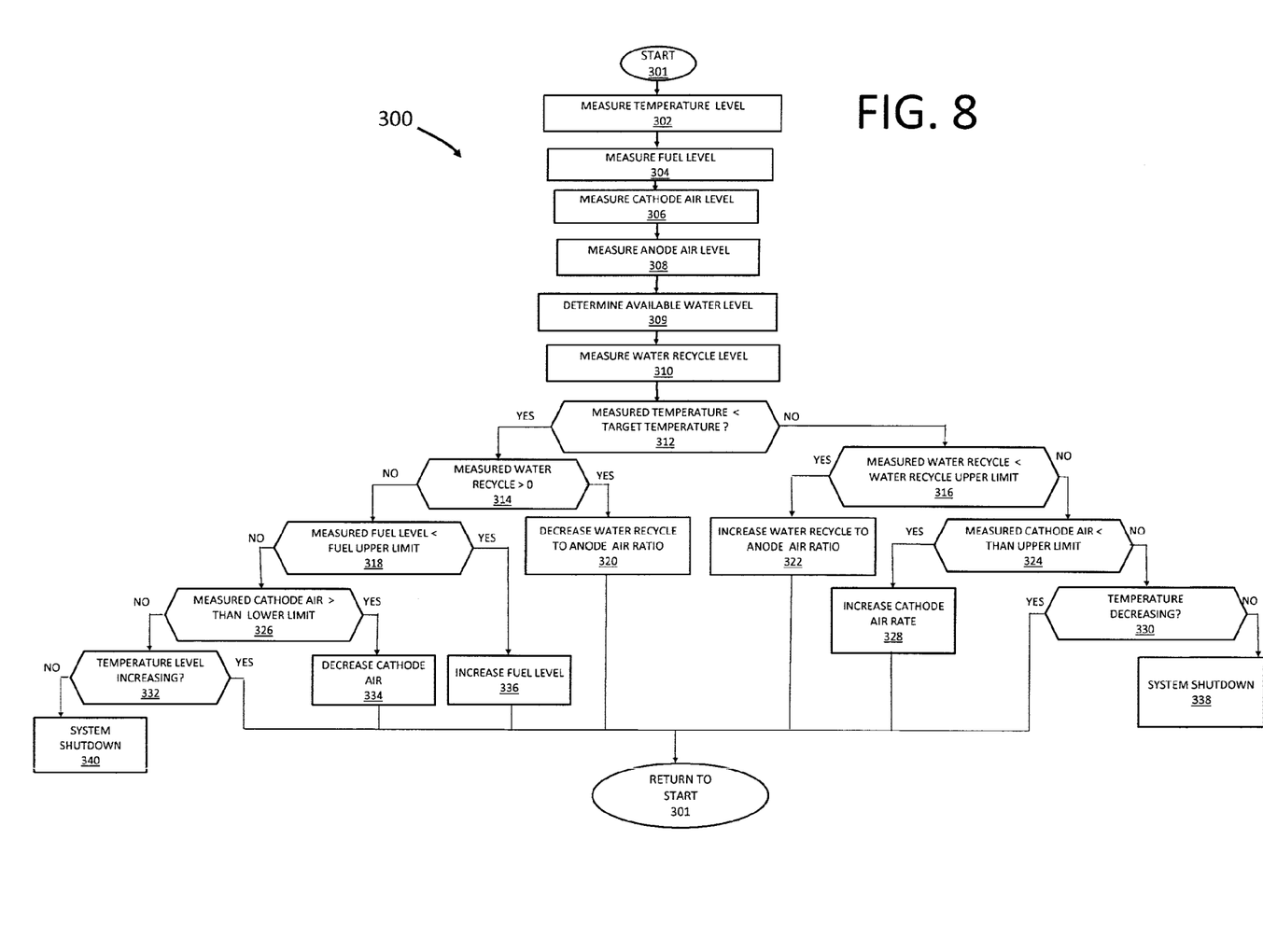
FIG. 8 depicts a flow chart diagram of a method for controlling the fuel cell system of FIG. 1 in accordance with an exemplary embodiment.

FIG. 8 depicts a method 300 for operating a fuel cell system 10. The method 300 is utilized to control actuators of the fuel cell system 10 during a nominal operating mode. The controller 110 can further utilize other methods for controlling actuators in addition to utilizing the method 300 when other operating modes are enabled. Other operating modes include, for example, a startup operating mode, a base shutdown operating mode, and a rapid shutdown operating mode. In an exemplary embodiment, the controller 110 transitions from a method for operating the fuel cell system 10 during the startup operating mode to the method for operating the fuel cell system at the nominal operating mode when a lower operating temperature limit is reached.

At step 301, the controller 110 initializes program settings for executing steps of the method 300. At step 302, the controller 110 receives a signal indicative of temperature from the thermocouple 67. At step 304, the controller 110 receives a signal indicative of a fuel flow rate to mixing chamber 24 from a fuel flow sensor (not shown). At step 306, the controller 110 receives a signal indicative of a rate of air flow to the insulated chamber 52 through the outlet 80 of the heater recuperator 18 from a cathode air flow sensor (not shown). At step 308, the controller 110 receives a signal indicative of a rate of air flow to the mixing chamber 24 from the anode air flow sensor 97. At step 309, the controller 110 receives a signal indicative of available water level from the humidity sensor 98. At step 310, the controller 110 receives a signal indicative of recycled water flow rate from the recycled water flow sensor 96.

At step 312, the controller 110 determines whether the temperature (302) is greater than a target operating temperature. The target operating temperature is a preferred operating temperature and can be selected based on material composition utilized by the fuel cell system 10 and by desired performance criteria such as power output and durability. In an exemplary embodiment, the target operating temperature is set: to an operating temperature between 700 degrees Celsius and 850 degrees Celsius. If the measured temperature is greater than the target operating temperature, then the controller 110 proceeds to step 316. If the measured temperature is not less than the target operating temperature, then the controller 110 proceeds to step 314.

At step 314, the controller 110 determines whether the measured recycled water flow rate (310) is greater than zero, that is, whether water is being recycled to the mixing chamber 24. If water is being recycled to the mixing chamber 24, the controller 110 proceeds to step 320. If water is not being recycled to the mixing chamber 24, the controller 110 proceeds to step 318.

At step 320, the controller 110 decreases the rate of recycled water flow rate to the mixing chamber 24 a precalibrated amount while increasing the rate of air flow to the mixing chamber a precalibrated amount, thereby maintaining the combined air and recycled water flow rate within a desired level based on the rate of fuel flow. The controller 110 then recycles to start (301).

At step 318, the controller 110 determines whether the rate of fuel flow to the mixing chamber 24 (304) is greater than a threshold rate of fuel flow. If the rate of fuel flow is less than the threshold rate of fuel flow, the controller 110 proceeds to step 336. If the rate of fuel flow is not less than the threshold rate of fuel flow, the controller 110 proceeds to step 326. In an alternate embodiment, fuel is controlled to a target fuel rate, and when step 314 determines water recycle is not greater than zero, the method proceeds directly to step 326.

At step 336, the controller 110 increases the rate of fuel flow to the mixing chamber 24 by stepping up the rate of fuel flow a precalibrated amount, thereby actuating a fuel valve (not shown). The controller 110 then recycles to start (301).

At step 326, the controller 110 determines whether the measured rate of air flow to the insulated chamber 52 through the outlet 80 (hereafter referred to as "cathode air flow rate") is greater than a cathode air flow lower limit. The cathode air flow rate lower limit is a precalibrated lower limit based on temperature and power draw and is configured to provide a stable operating environment. If the cathode air flow rate is greater than cathode air flow rate lower limit, the controller 110 proceeds to step 334. If the cathode air flow rate is not greater than cathode air flow rate lower limit, the controller 110 proceeds to step 322.

At step 334, the controller 110 decreases the cathode air flow rate by stepping down the cathode air flow rate a precalibrated amount. The controller 110 then recycles to start (301).

At step 332, the controller determines whether the temperature (302) is increasing over a predetermined time. If the temperature is increasing, the controller 110 then recycles to start (301). If the temperature is not increasing, the controller 110 initiates system shutdown 340.

At step 316, the controller 110 determines whether measured recycled water flow rate (310) is less than a threshold recycled water flow rate. The threshold recycled water flow rate is determined based on the available water level (309). If the recycled water flow rate is less than the threshold recycled water flow rate, the method 300 proceeds to step 322. If the measured recycled water flow rate (310) is not less than the threshold recycled water flow rate (309), the method proceeds to step 324.

At step 322, the controller 110 increases the recycled water flow rate to the mixing chamber 24 by stepping up the recycled water flow rate a precalibrated amount and stepping up the air flow rate to the mixing chamber 24 a precalibrated amount. The controller 110 then recycles to start (301).

At step 324, the controller 110 determines whether the measured cathode air flow rate (306) is less than a cathode air flow rate upper limit. If the measure cathode air flow rate is less than a cathode air flow rate upper limit, the method 300 proceeds to step 328. If the cathode air flow rate is not less than the cathode air flow rate upper limit, the method proceeds to step 330.

At step 328, the controller 110 increases the cathode air flow rate by stepping up the cathode air flow rate a precalibrated amount, thereby increasing power to a cathode air pump (not shown). The controller 110 then recycles to start (301).

At step 330, the controller 110 determines whether the measured temperature (302) is decreasing over a predetermined time. If the measured temperature is increasing, the controller 110 then recycles to start (301). If the measured temperature is not increasing, the controller 110 initiates system shutdown 338.

The exemplary embodiments shown in the figures and described above illustrate, but do not limit, the claimed invention. It should be understood that there is no intention to limit the invention to the specific form disclosed; rather, the invention is to cover all modifications, alternative constructions, and equivalents falling within the spirit and scope of the invention as defined in the claims. Therefore, the foregoing description should not be construed to limit the scope of the invention.

The invention claimed is:

1. A method for operating a fuel cell system, the fuel cell system comprising a fuel cell stack, an internal fuel reformer, a hydrogen separation member, and an anode air actuator configured to provide anode air to the internal reformer, the method comprising:
    monitoring a signal indicative of a water level within the fuel cell system;
    monitoring a signal indicative of fuel flow rate within the fuel cell system;
    determining an anode air flow rate based on the monitored signal indicative of water level and the signal indicative of fuel flow rate; and
    controlling the anode air actuator based on the determined anode air flow rate.

2. The method of claim 1, wherein monitoring the signal indicative of water level includes monitoring a current draw from the fuel cell stack and determining a water level within the fuel cell system based on the current draw from the fuel cell stack.

3. The method of claim 1 further comprising:
    determining a water flow rate based on the monitored signal indicative of water level and controlling a water actuator of the fuel cell system based on the monitored signal indicative of water level.

4. The method of claim 1, further comprising:
    monitoring a humidity sensor and
    determining a water flow rate based on the humidity sensor measurement.

5. The method of claim 1, further comprising:
    combining a fuel flow stream at least one of an air flow stream and a water flow stream and
    reacting the fuel flow stream with at least one of the air flow stream and the water flow stream within the internal reformer of the fuel cell system.

6. The method of claim 5, further comprising:
    combining a fuel flow stream with both an air flow stream and a water flow stream and
    reacting the fuel flow stream with at least one of the air flow stream and the water flow stream within the internal reformer of the fuel cell system.

7. The method of claim 5, further comprising reacting the fuel within the internal reformer of the fuel cell system to produce hydrogen and exhaust gas.

8. The method of claim 7, further comprising separating hydrogen from exhaust gas utilizing the hydrogen separation member disposed within the fuel cell stack.

9. The method of claim 7, further comprising routing hydrogen from a first side of the hydrogen separation member through the hydrogen separation member to a second side of the hydrogen separation member.

10. The method of claim 7, further comprising separating hydrogen from exhaust utilizing a hydrogen separation member disposed within a solid oxide fuel cell tithe of the fuel cell stack.

11. The method of claim 7, further comprising detecting a water vapor level greater than a first threshold water land operating the fuel cell system in an autothermal reforming mode when the water vapor level is greater than the first threshold water level.

12. The method of claim 6, further comprising detecting a water vapor level greater than a second threshold and steam reforming when the water vapor level is greater than the second threshold.

* * * * *